United States Patent
Sharma et al.

(10) Patent No.: US 9,708,465 B2
(45) Date of Patent: Jul. 18, 2017

(54) COLOR-STABLE THERMOPLASTIC COMPOSITION

(71) Applicant: SABIC Innovative Plastics IP B.V., Bergen op Zoom (NL)

(72) Inventors: Yogesh Omprakash Sharma, Maharashtra (IN); Vinodkumar Vasudevan, Kerala (IN); Meerakani Mohamed Ali Sait, Tamil Nadu (IN); Paul Dean Sybert, Evansville, IN (US); Olga Kuvshinnikova, Glenmont, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 670 days.

(21) Appl. No.: 13/904,642

(22) Filed: May 29, 2013

(65) Prior Publication Data

US 2014/0357768 A1    Dec. 4, 2014

(51) Int. Cl.
   *C08K 5/3432*   (2006.01)
   *C08K 5/3437*   (2006.01)
   (Continued)

(52) U.S. Cl.
   CPC .......... *C08K 5/3432* (2013.01); *C08K 5/3437* (2013.01); *C08L 67/03* (2013.01); *C08L 69/005* (2013.01)

(58) Field of Classification Search
   USPC .......................................... 524/99, 102, 104
   See application file for complete search history.

(56) References Cited

U.S. PATENT DOCUMENTS

| 4,493,915 A | 1/1985 | Lohmeijer |
| 4,600,647 A | 7/1986 | Robeson et al. |

(Continued)

FOREIGN PATENT DOCUMENTS

| EP | 0166820 A1 | 1/1986 |
| EP | 0303988 A2 | 2/1989 |

(Continued)

OTHER PUBLICATIONS

International Preliminary Report on Patentability for International Application No. PCT/US2014/017531; International Filing Date Feb. 21, 2014; Date of Mailing Jun. 18, 2015; 26 pages.

(Continued)

*Primary Examiner* — Ling Choi
*Assistant Examiner* — Thuy-Ai N Nguyen
(74) *Attorney, Agent, or Firm* — Cantor Colburn LLP

(57) ABSTRACT

A thermoplastic composition is disclosed that includes a polyaryl ester polymer or copolymer and a phthalone compound according to the formula

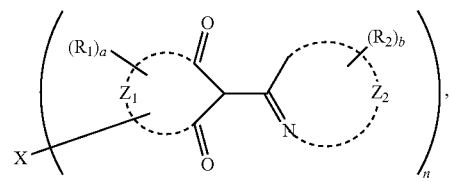

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ can independently be halogen, an alkyl group, an aryl (Continued)

group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2 and is a single bond or a divalent organic radical bonded to the $Z_1$ ring structure through an ether, ketone, or thio linkage.

40 Claims, 1 Drawing Sheet

(51) Int. Cl.
*C08L 67/03* (2006.01)
*C09B 25/00* (2006.01)
*C08L 69/00* (2006.01)

(56) References Cited

U.S. PATENT DOCUMENTS

| | | |
|---|---|---|
| 4,959,449 A | 9/1990 | Stautzenberger et al. |
| 5,478,878 A | 12/1995 | Nagaoka et al. |
| 6,228,910 B1 | 5/2001 | Shakhnovich |
| 6,410,620 B2 | 6/2002 | Shakhnovich |
| 6,414,058 B2 | 7/2002 | Shakhnovich |
| 6,492,015 B1 | 12/2002 | Aoki et al. |
| 6,583,256 B2 | 6/2003 | Vollenberg et al. |
| 6,607,814 B2 | 8/2003 | Pickett et al. |
| 6,775,059 B2 | 8/2004 | Kuwabara |
| 7,655,085 B2 | 2/2010 | Shankarling et al. |
| 7,790,292 B2 | 9/2010 | Colborn et al. |
| 2004/0197545 A1 | 10/2004 | Gehlsen et al. |
| 2005/0260369 A1 | 11/2005 | Graf et al. |
| 2006/0264582 A1 | 11/2006 | Mullen et al. |
| 2007/0100088 A1 | 5/2007 | Gallucci et al. |
| 2007/0155913 A1 | 7/2007 | Chakravarti et al. |
| 2011/0274900 A1 | 11/2011 | Megally et al. |
| 2012/0208110 A1* | 8/2012 | Burns et al. ............. 430/2 |
| 2012/0251750 A1 | 10/2012 | Sybert et al. |
| 2012/0252961 A1 | 10/2012 | Sybert et al. |
| 2014/0357768 A1 | 12/2014 | Sharma et al. |

FOREIGN PATENT DOCUMENTS

| | | | |
|---|---|---|---|
| EP | 0872526 A1 | 10/1998 | |
| EP | 1090744 B1 | 4/2001 | |
| EP | 2423250 A2 | 2/2012 | |
| EP | 2426174 A1 | 3/2012 | |
| GB | 870680 * | 6/1961 | ........... C07D 213/50 |
| JP | 8066953 A | 3/1996 | |
| JP | 10330524 A | 12/1998 | |
| JP | 2926635 B2 | 7/1999 | |
| JP | 3142964 B2 | 3/2001 | |
| JP | 2003082201 A | 3/2003 | |
| JP | 2006182980 A | 7/2006 | |
| JP | 3121626 B2 | 1/2011 | |
| JP | 2012227359 A | 11/2012 | |
| WO | 0007812 A1 | 2/2000 | |
| WO | 0015718 A1 | 3/2000 | |
| WO | 2009004528 A1 | 1/2009 | |
| WO | 2012054595 A1 | 4/2012 | |
| WO | 2013020129 A2 | 2/2013 | |

OTHER PUBLICATIONS

International Search Report and Written Opinion regarding related PCT Application No. PCT/US2014/017531; dated Aug. 1, 2014; 10 pgs.
International Search Report and Written Opinion regarding related PCT Application No. PCT/US2014/039982; dated Oct. 1, 2014; 9 pgs.
International Search Report for International Application No. PCT/US2014/017531; International Filing Date Feb. 21, 2014; Date of Mailing Aug. 1, 2014; 5 pages.
International Search Report for International Application No. PCT/US2014/039982; International Filing Date May 29, 2014; Date of Mailing Oct. 1, 2014; 4 pages.
Japanese Patent No. 10330524 A; Publication Date: Dec. 15, 1998; Abstract Only, 1 page.
Japanese Patent No. 2003082201; Date of Publication: Mar. 19, 2003; Abstract Only, 1 Page.
Japanese Patent No. 2006182980; Date of Publication: Jul. 13, 2006; Abstract Only, 1 Page.
Japanese Patent No. 2012227359; Date of Publication: Nov. 15, 2012; Abstract Only, 1 Page.
Japanese Patent No. 2926635; Publication Date: Jul. 28, 1999; Abstract Only, 2 pages.
Japanese Patent No. 3121626; Date of Publication: Jan. 9, 2001; Abstract Only, 2 Pages.
Japanese Patent No. 3142964; Publication Date: Mar. 7, 2001; Abstract Only, 2 pages.
Japanese Patent No. 8066953 A; Publication Date: Mar. 12, 1996; Abstract Only, 1 page.
Written Opinion for International Application No. PCT/US2014/017531; International Filing Date Feb. 21, 2014; Date of Mailing Aug. 1, 2014; 5 pages.
Natarajan, Arunkumar, et al., "Pyrophthalones as Blue Wavelength Absorbers in Thermoplastic Media", Photochemistry and Photobiology, 2011, The American Society of Photobiology 0031-8655/11, pp. 1-7.

* cited by examiner

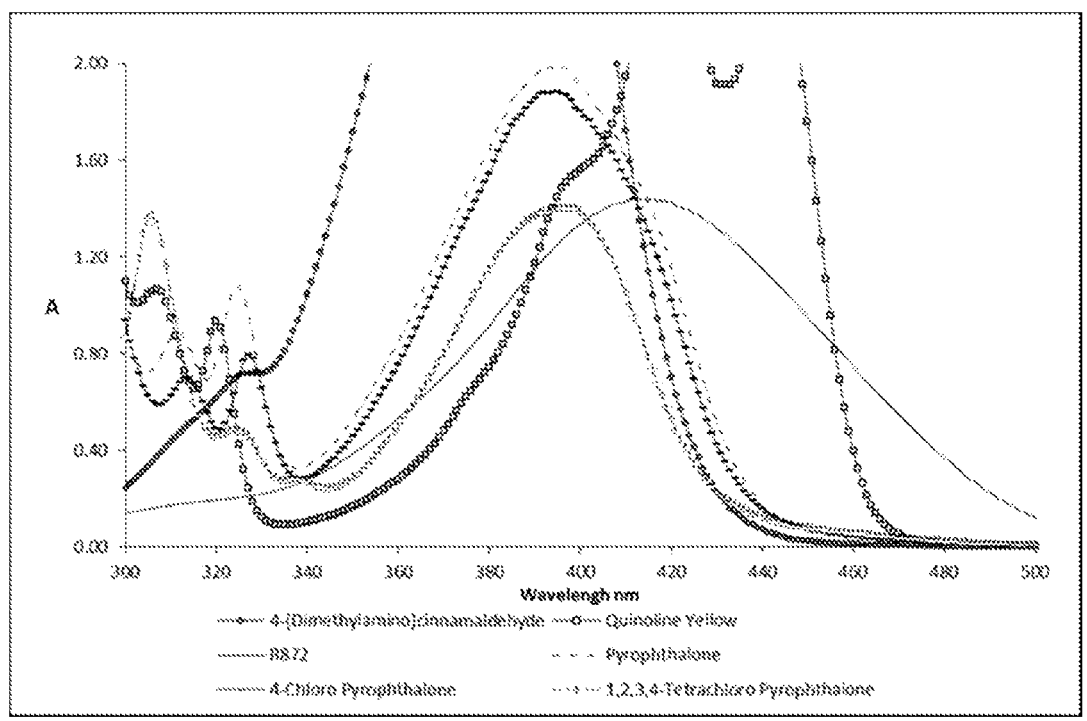

COLOR-STABLE THERMOPLASTIC COMPOSITION

BACKGROUND OF THE INVENTION

This disclosure relates to color-stable thermoplastic compositions, and in particular to color-stable thermoplastic polymer compositions comprising polyaryl ester, methods of manufacture, and uses thereof.

Thermoplastic polymers of various compositions, such as polyesters and polyester-polycarbonate copolymers, are useful in the manufacture of articles and components for a wide range of applications such as automotive parts, electronic appliances, and numerous others. Because of their broad use, it is often necessary for various reasons, including aesthetic and functional reasons, to provide plastic articles and components according to targeted color specifications, which is often accomplished by incorporating dyes or pigments into the polymer melt. It can also be important that the color of the thermoplastic composition is stable after exposure to various conditions such as heat exposure, light exposure (including ultraviolet (UV) light exposure), etc. Many polymers, including the above-described polyesters and polyester-polycarbonate copolymers, have been found to be subject to yellowing after light exposure, which can adversely impact the color stability performance of a thermoplastic composition. This yellowing phenomenon, sometimes referred to as photoyellowing, is often addressed with various technologies such as UV absorbers (UVA's), stabilizers such as hindered amine light stabilizers (HALS), and dyes and pigments (e.g., for color compensation, light filtration, or combinations thereof).

Polyaryl esters, as the term is used herein, include polyesters derived from aromatic diacids (i.e., polyarylates) and from aromatic diols. Polyaryl esters are known to be susceptible to photoyellowing that has been difficult to address with known techniques and materials, especially for some colors and/or some shades of some colors. Accordingly, there remains a need for new solutions to addressing color stability of polyaryl esters across a variety of targeted color specifications.

SUMMARY OF THE INVENTION

The above-described and other deficiencies of the art are addressed by a thermoplastic composition comprising a polyaryl ester polymer or copolymer and a phthalone compound according to the formula:

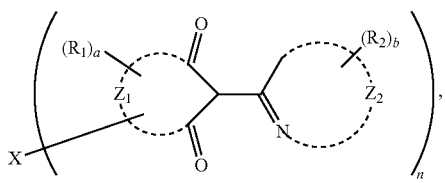

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ can independently be halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2 and is a single bond or a divalent organic radical bonded to the $Z_1$ ring structure through an ether, ketone, or thio linkage.

In another aspect, a formed plastic article comprises the above-described thermoplastic composition.

In yet another aspect, a method of making a plastic article comprises heating the above-described thermoplastic composition to a melt temperature of at least 250° C., and extruding or molding the plastic article. Still another aspect is directed to the article made by this method.

In yet another aspect, a method of making a plastic article comprises casting a film of the above-described thermoplastic composition from solution. Still another aspect is directed to the article made by this method.

The above described and other features are exemplified by the following detailed description.

BRIEF DESCRIPTION OF THE DRAWINGS

Referring now to the drawings, the FIGURE is a spectral absorbance plot of compounds according to the above formula and other compounds.

DETAILED DESCRIPTION OF THE INVENTION

As described above, polyaryl esters are polymer comprising ester repeat units that have aromatic content. In some embodiments, this aromatic content can be derived from an aromatic diacid, in which case the polymer is referred to as a polyarylate, and/or the aromatic content can be derived from an aromatic diol. Aromatic diacid or diacids can include isophthalic acid, terephthalic acid, or mixtures of isophthalic and terephthalic acids. Suitable dicarboxylic acids also include those derived from aromatic polycyclic compounds, illustrative examples of which include diphenyl dicarboxylic acid, diphenylether dicarboxylic acid, and naphthalenedicarboxylic acids, such as naphthalene-2,6-dicarboxylic acid. Alternatively, dicarboxylic acid derivatives, such as diesters of dicarboxylic acids or acid halides of dicarboxylic acids (e.g., diacid chlorides), may be used to prepare polyaryl esters.

In some embodiments, the polyaryl ester polymer or copolymer comprises at least 5 wt. %, based on the weight of the polyaryl ester, of repeat units according to formula (A):

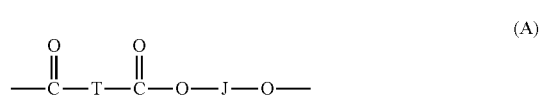

in which at least 80 percent of the total number of T groups, and/or at least 80 percent of the total J groups contain aromatic moieties and the balance thereof are aliphatic, alicyclic, or aromatic. Aromatic T groups can be derived from aromatic dicarboxylic acids such as or a diacid of a $C_{6-20}$ arylene group. More specifically, isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids can be used. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 97:3 to 2:98. In another specific embodiment, J is a $C_{2-6}$ alkylene group or a phenylene group and T is p-phenylene, m-phenylene, naphthalene. Other, non-aromatic diacids can be used such as a diacid of a $C_{2-18}$ alkylene group or a $C_{6-20}$ cycloalkylene, including adipic acid, succinic acid, sebacic acid, dodecanoic acid a divalent cycloaliphatic group, or a combination thereof. In some embodiments, at least 80 percent of the total number of T groups contain aromatic moieties. In more specific embodiments, at least 90 percent (more specifically 95 percent, and even move specifically 100 percent) of the T groups contain aromatic moieties.

Aromatic J groups can be derived from aromatic diols such as resorcinol, hydroquinone, catechol, 4,4'-dihydroxybiphenyl, 1,6-dihydroxynaphthalene, 2,6-dihydroxynaphthalene, bisphenol A, bis(4-hydroxyphenyl)methane, and various other well-known bisphenol compounds and $C_{6-20}$ arylene diols. In some, more specific embodiments, aromatic J groups are derived from resorcinol. Nonaromatic J groups can be derived from dihydroxy compounds of a $C_{2-10}$ alkylene, a $C_{6-20}$ cycloalkylene, or a polyoxyalkylene group in which the alkylene groups contain 2 to 6 carbon atoms, specifically 2, 3, or 4 carbon atoms. Poly(ethylene terephthalate) is a polyester having T groups derived from terephthalic acid and J groups derived from ethylene glycol. Copolyesters containing a combination of multiple or different T and/or J groups can be used. Additional examples of diols that can form T and/or J groups can be found below in the descriptions of formulas (2), (3) and (6) below.

The polyaryl esters can be branched or linear. In another embodiment, J is a $C_{2-30}$ alkylene group having a straight chain, branched chain, or cyclic (including polycyclic) structure. J can be derived from an aromatic dihydroxy compound of formula (3) above, or from an aromatic dihydroxy compound of formula (4) above, or from an aromatic dihydroxy compound of formula (6) above.

Formula (B) below encompasses dicarboxylic acid residues in polyarylates made from reacting a diol with an isophthalic and/or terephthalic acid and/or derivatives of the acids such as the acid halides, carboxylic acid esters and carboxylic acid salts of isophthalic and/or terephthalic acid:

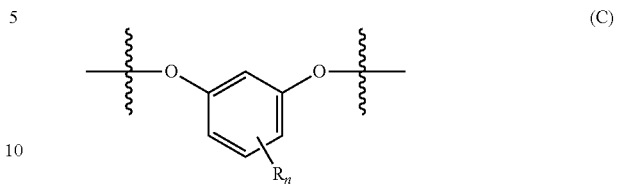

(B)

with the vertical wavy lines denoting periphery of the dicarboxylic acid residue, and thus positioned differently from the conventional position as used to denote a polymer repeat unit.

As mentioned above, aromatic content in a polyaryl ester can also be derived from aromatic diol(s) used in the formation of the polyester chain. Resorcinol is an example of an aromatic diol that has been used in polyaryl esters. Other exemplary aromatic diols include 4,4'-dihydroxybiphenyl, 1,6-dihydroxynaphthalene, 2,6-dihydroxynaphthalene, bis(4-hydroxyphenyl)methane, and various other well-known bisphenol compounds. When an aromatic diol such as resorcinol is used in the formation of a polyaryl ester, the resulting structure is shown in Formula (C) below:

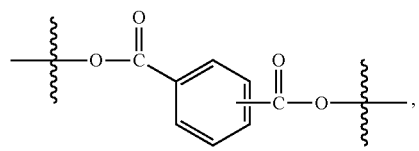

(C)

wherein each R is independently at least one of $C_{1-12}$ alkyl, $C_6$-$C_{24}$ aryl, alkyl aryl, alkoxy or halogen, and n is an integer from 0 to 4.

The polyaryl esters described herein can be regular polyesters where all the repeat units in the polymer are ester units according to formula (A), or they can be copolymers where at least 5 wt. % of the units (e.g., 5-30 wt. %, 5-20 wt. %), and more specifically at least 70 wt. % (e.g., 75-90 wt. %, 75-85 wt. %) of the units are ester units according to formula A. The remaining polymer units can be any other type of polymer unit known to be copolymerizable with polyester, such as polycarbonate, with the weight percentages based on the total weight of the copolymer.

A "polycarbonate" means compositions having repeating structural carbonate units of formula (1)

(1)

in which at least 60 percent of the total number of $R^1$ groups contain aromatic moieties and the balance thereof are aliphatic, alicyclic, or aromatic. As used herein, the term "polycarbonate" includes polycarbonate copolymers such as polyaryl ester polycarbonate copolymers.

Polycarbonates can be derived from solution, interfacial or melt polymerization reactions between a diol and a carbonate precursor, and are readily copolymerized with polyesters including polyaryl esters as described herein. In the case of interfacial polymerization, carbonate precursors can include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. Phosgene can also be a carbonate precursor in, an interfacial polymerization reaction to form carbonate linkages, which is referred to as a phosgenation reaction. In the case of melt polymerization, copolymers can be prepared by co-reacting, in a molten state, the dihydroxy reactant(s) and a diaryl carbonate ester, such as diphenyl carbonate, in the presence of a transesterification catalyst in a vessel or mixer or combination of vessels/mixers such as a CSTR (continuous stirred tank reactor), Banbury** mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters.

All types of polycarbonate end groups are contemplated as being useful in the polycarbonate composition, provided that such end groups do not significantly adversely affect desired properties of the compositions.

With respect to the diols (i.e., dihydroxy compounds) used in the manufacture of polycarbonates, in some embodiments each $R^1$ of formula (1) is a $C_{6-30}$ aromatic group, that is, contains at least one aromatic moiety. $R^1$ can be derived from a dihydroxy compound of the formula HO—$R^1$—OH, in particular of formula (2)

$$\text{HO-A}^1\text{-Y}^1\text{-A}^2\text{-OH} \tag{2}$$

wherein each of $A^1$ and $A^2$ is a monocyclic divalent aromatic group and $Y^1$ is a single bond or a bridging group having one or more atoms that separate $A^1$ from $A^2$. In some embodiments, one atom separates $A^1$ from $A^2$. Specifically, each $R^1$ can be derived from a dihydroxy aromatic compound of formula (3)

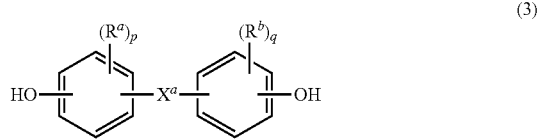

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In some embodiments, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In some embodiments, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In some embodiments, $X^a$ can be a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

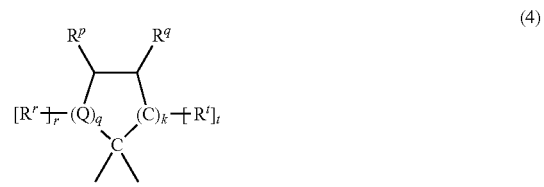

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (4) can be used in the manufacture of polycarbonates containing phthalimidine carbonate units of formula (4a)

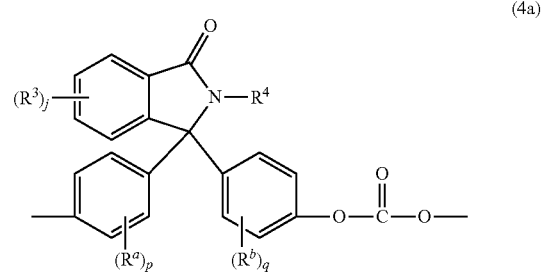

wherein $R^a$, $R^b$, p, and q are as in formula (4), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

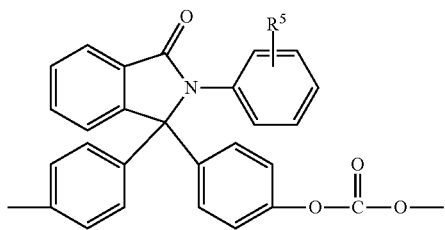

(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl) phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin-derived carbonate units of formula (4c) and (4d)

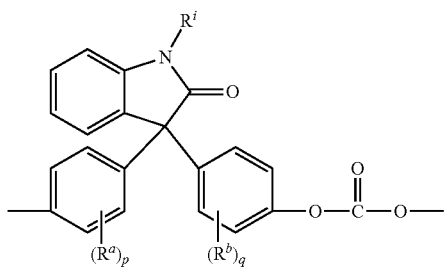

(4c)

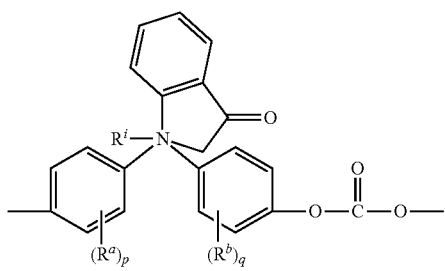

(4d)

wherein $R^a$ and $R^b$ are each independently $C_{1-12}$ alkyl, p and q are each independently 0 to 4, and $R^i$ is $C_{1-12}$ alkyl, phenyl, optionally substituted with 1 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{14}$ alkyl or phenyl.

Examples of bisphenol carbonate units derived from bisphenols (4) wherein $X^a$ is a substituted or unsubstituted $C_{3-18}$ cycloalkylidene include the cyclohexylidene-bridged, alkyl-substituted bisphenol of formula (4e)

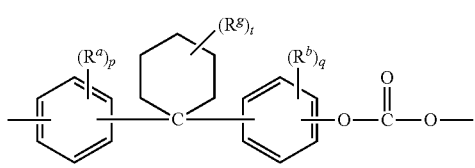

(4e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{14}$ alkyl, $R^g$ is $C_{14}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0. For example, Examples of other bisphenol carbonate units derived from bisphenol (4) wherein $X^a$ is a substituted or unsubstituted $C_{3-18}$ cycloalkylidene include units (4f) (also known as adamantyl units) and units (4g)

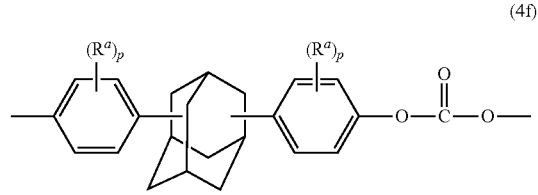

(4f)

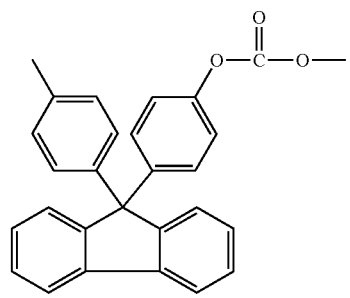

(4g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) are useful for making polycarbonates with high glass transition temperatures (Tg) and high heat distortion temperatures.

Other useful aromatic dihydroxy compounds of the formula HO—$R^1$—OH include compounds of formula (6)

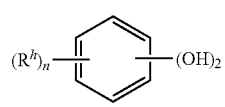

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)

phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

Polyaryl ester polymers and copolymers (including copolymers of polyester and polycarbonate) can be manufactured by any of a number of known techniques. One technique involves a catalyzed polycondensation transesterification reaction between diol and diacid, and optionally a carbonate source such as a dicarbonate ester, and is also known as melt polymerization. Another technique involves an acylation reaction between a diol and an acid halide analog of a dicarboxylic acid, and optionally a carbonate source such as phosgene (also known as interfacial polymerization). For example, with interfacial polymerization, instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Catalysts are typically used to promote melt polymerization or interfacial polymerization. The transesterification reaction can be catalyzed by acid or base catalysts, where strong acids catalyze the carbonyl-alcohol reaction by donating a proton to carbonyl groups on the diacid or carbonate source and bases catalyze the reaction by removing a proton from hydroxyl groups on the diol. Phase transfer catasyts can also be used to promote either interfacial or melt polymerization. Exemplary phase transfer catalysts include catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. A phase transfer catalyst can be used in an amount of 0.1 to 10 wt. %, more specifically from 0.5 to 2 wt. %, based on the weight of diol in the polymerization reaction mixture. Exemplary catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

A chain stopper (also referred to as a capping agent) can be included during polymerization. The chain stopper limits molecular weight growth rate, and so controls molecular weight in the polymer. Chain stoppers include certain monophenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Branched polyaryl ester polymers and copolymers can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %, based on the total weight of the polyaryl ester polymer or copolymer. Mixtures comprising linear polymers and branched polymers can be used.

In some embodiments, the polyester unit of a polyester-polycarbonate is derived from the reaction of a combination of isophthalic and terephthalic diacids (or derivatives thereof) with resorcinol. In some embodiments, the polyester unit of a polyester-polycarbonate is derived from the reaction of a combination of isophthalic acid and terephthalic acid with bisphenol A. In still other embodiments, the polycarbonate units are derived from bisphenol A. In other embodiments, the polycarbonate units are derived from resorcinol and bisphenol A in a molar ratio of resorcinol carbonate units to bisphenol A carbonate units of 1:99 to 99:1.

The molar ratio of ester units to carbonate units in polyester polycarbonate copolymers can vary broadly, for example from 1:99 to 99:1, specifically 10:90 to 90:10, more specifically 25:75 to 75:25, depending on the desired properties of the final composition, and subject to the presence of at least 5 wt. % of ester units of formula (A).

As described above, the thermoplastic composition comprises a phthalone compound according to the formula (7)

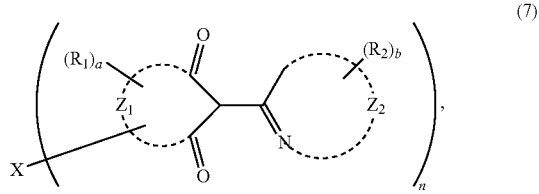

(7)

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ can independently be halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2 and is a single bond or a divalent organic radical bonded to the $Z_1$ ring structure through an ether, ketone, or thio linkage.

More specifically, each $R_1$ and each $R_2$ can each independently be halogen, a $C_1$-$C_{18}$ alkyl group, a $C_6$-$C_{12}$ aryl group, an $C_1$-$C_{18}$ alkoxy group, a $C_6$-$C_{12}$ aryloxy group, an aromatic ($C_6$-$C_{12}$) or aliphatic ($C_1$-$C_{18}$) thioether group, an aromatic ($C_7$-$C_{13}$) or aliphatic ($C_2$-$C_{19}$) carboxylic acid ester group, or an aromatic ($C_6$-$C_{12}$) or aliphatic ($C_1$-$C_{18}$) amide group. In some, more specific, embodiments, each $R_1$ and each $R_2$ is independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group. Exemplary aromatic ring structures represented by $Z_1$ and $Z_2$ in formula (7) are depicted in the formulas below As mentioned above, X is present only if n=2 and is a single bond or a divalent organic radical bonded to the $Z_1$ ring structure through an ether, ketone, or thio linkage. Examples of divalent radicals for X include

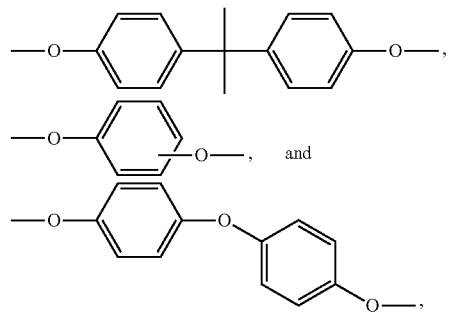

and their thio ether analogs.

In some embodiments, the phthalone compound is represented by formula (8)

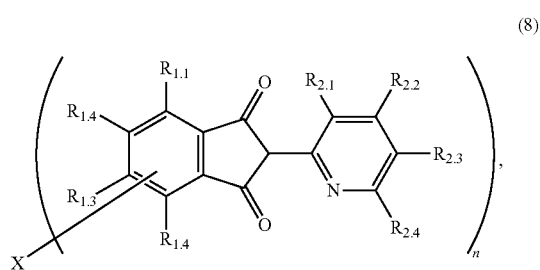

(8)

wherein $R_{1.1}$, $R_{1.2}$, $R_{1.3}$, $R_{1.4}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined above, and X is present in place of one of $R_{1.1}$, $R_{1.2}$, $R_{1.3}$, or $R_{1.4}$ when n is 2.

In some embodiments, the phthalone compound is represented by formula (9)

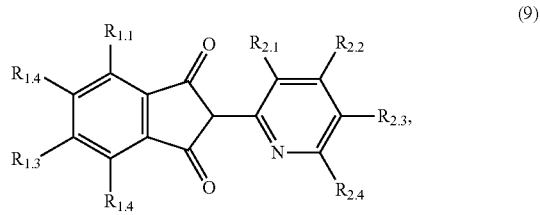

(9)

wherein $R_{1.1}$, $R_{1.2}$, $R_{1.3}$, $R_{1.4}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

In some embodiments, the phthalone compound is represented by formula (10)

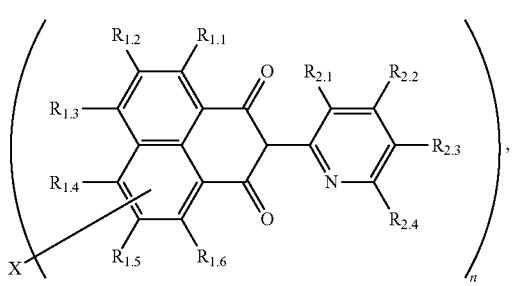

wherein $R_{1.1}$, $R_{1.2}$, $R_{1.3}$, $R_{1.4}$, $R_{1.5}$, $R_{1.6}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined above, and X is present in place of one of $R_{1.1}$, $R_{1.2}$, $R_{1.3}$, $R_{1.4}$, $R_{1.5}$, or $R_{1.6}$, when n is 2.

In some embodiments, the phthalone compound is represented by formula (11)

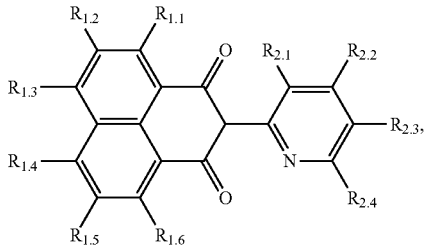

wherein $R_{1.1}$, $R_{1.2}$, $R_{1.3}$, $R_{1.4}$, $R_{1.5}$, $R_{1.6}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

In some embodiments, the phthalone compound is represented by formula (12)

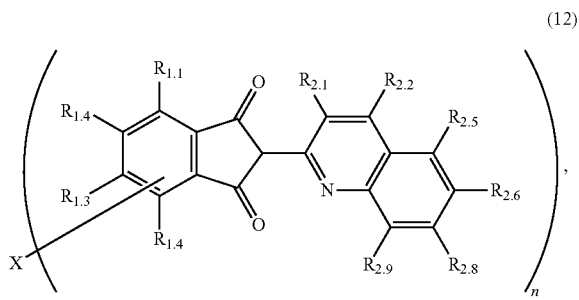

wherein $R_{1.1}$, $R_{1.2}$, $R_{1.3}$, $R_{1.4}$, $R_{2.1}$, $R_{2.2}$, $R_{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined above, and X is present in place of one of $R_{1.1}$, $R_{1.2}$, $R_{1.3}$, or $R_{1.4}$ when n is 2.

In some embodiments, the phthalone compound is represented by formula (13)

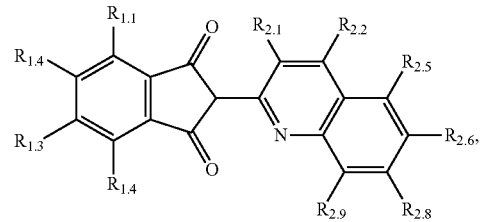

wherein $R_{1.1}$, $R_{1.2}$, $R_{1.3}$, $R_{1.4}$, $R_{2.1}$, $R_{2.2}$, $R_{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

In some embodiments, the phthalone compound is represented by formula (14)

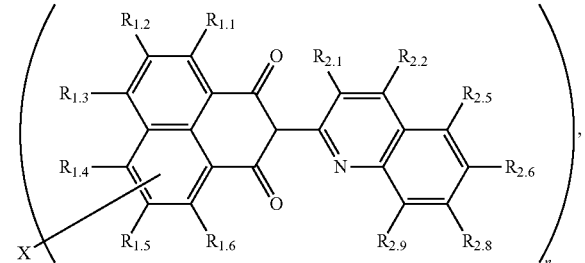

wherein $R_{1.1}$, $R_{1.2}$, $R_{1.3}$, $R_{1.4}$, $R_{2.1}$, $R_{2.2}$, $R_{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined above, and X is present in place of one of $R_{1.1}$, $R_{1.2}$, $R_{1.3}$, $R_{1.4}$, $R_{1.5}$, or $R_{1.6}$, when n is 2.

In some embodiments, the phthalone compound is represented by formula (15)

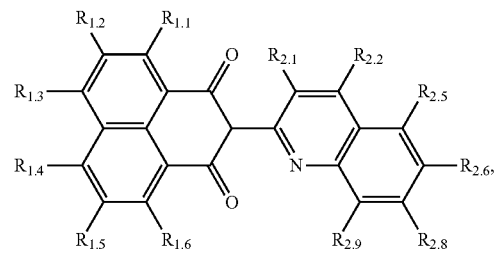

wherein $R_{1.1}$, $R_{1.2}$, $R_{1.3}$, $R_{1.4}$, $R_{2.1}$, $R_{2.2}$, $R_{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

In some embodiments, the atoms $Z_1$ necessary to complete a 9- to-13-membered single or fused aromatic ring structure form a second phthalone structure, as shown in formula (16)

(16)

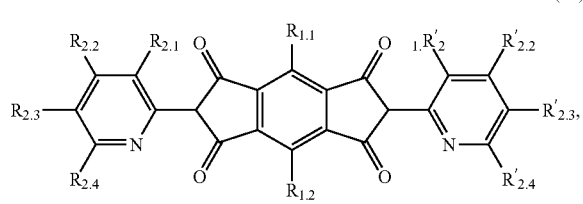

wherein $R_{1.1}$, $R_{1.2}$, $R_{2.1}$, $R_{2.2}$, $R_{2.3}$, $R_{2.4}$, $R'_{2.1}$, $R'_{2.2}$, $R'_{2.3}$, and $R'_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group. Of course, a quinoline ring can be present in place of the pyridine rings in formula (16).

The phthalone compounds described herein can be synthesized by well-known techniques, such as a condensation reaction of a substituted or unsubstituted phthalic anhydride (or phthalic anhydride derivative or analog such as of naphthalic anhydride or the anhydride of phenyl tetracarboxylic acid) with a substituted or unsubstituted 2-methylpyridine or a substituted or unsubstituted 2-methylquinoline. X linking groups can be derived from appropriate substituents on the anhydride compound. Additional details regarding the synthesis of phthalone compounds and derivatives can be found in D. Manlet et al., "A Study of the Chemistry of Pyrophthalone and Related Compounds," *J. Org. Chem.*, 1958, 23 (3), pp 373-380, the disclosure of which is incorporated herein by reference in its entirety.

The amount of phthalone compound can vary based on a number of factors such as the thickness of the fabricated article and whether or not an opacifier like $TiO_2$ is present. Table 1 below shows representative loadings of the phthalone compound as weight percentages based on the total polyaryl ester polymer or copolymer weight:

TABLE 1

Dye Loadings for polymer articles

| Article thickness (mm) | Loading levels (broad) (wt. %) | Loading levels (more specific) (wt. %) | Loading Levels (even more specific) (wt. %) |
| --- | --- | --- | --- |
| 0.035-0.49 | 0.0001-1 | 0.001-0.1 | 0.01-0.05 |
| 0.5-1.49 | 0.0001-0.1 | 0.0001-0.01 | 0.0001-0.005 |
| 1.5-2.49 | 0.0001-0.1 | 0.0001-0.01 | 0.0001-0.005 |
| 2.5-3 | 0.0001-0.1 | 0.0001-0.01 | 0.0001-0.005 |

In some embodiments, the phthalone compound is present at from 0.0001 wt. % to 1 wt. %, based on the total weight of the polyaryl ester polymer or copolymer. In some embodiments, the phthalone compound is present at from 0.001 wt. % to 0.01 wt. %, based on the total weight of the polyaryl ester polymer or copolymer. In some embodiments, the phthalone compound is present at from 0.01 wt. % to 0.1 wt. %, based on the total weight of the polyaryl ester polymer or copolymer. In some embodiments, the phthalone compound is present at from 0.02 wt. % to 0.03 wt. % of the phthalone compound, based on the total weight of the polyaryl ester polymer or copolymer. Different loading levels can be used when the $TiO_2$ is present. In some embodiments, the $TiO_2$ is present at from 0.1 wt. % to 15 wt. %, based on the total weight of the polyaryl ester polymer or copolymer. In some embodiments, the $TiO_2$ is present at from 0.2 wt. % to 5 wt. %, based on the total weight of the polyaryl ester polymer or copolymer. In some embodiments, the $TiO_2$ is present at from 0.5 wt. % to 2 wt. %, based on the total weight of the polyaryl ester polymer or copolymer.

Without being bound by theory, it is believed that the favorable results obtained herein, i.e., color stable polyaryl ester thermoplastic compositions, are provided from the phthalone dyes that are sufficiently thermally stable to withstand polyaryl ester processing temperatures, while offering an exposure-induced decrease in absorbance (i.e., photobleaching) that is complementary, in wavelength range (e.g., 400-450 nm), amount of decrease in absorbance, and/or rate of decrease in absorbance, with the increase in absorbance (i.e., photoyellowing) experienced by polyaryl ester compositions.

In some embodiments, the thermoplastic composition exhibits color stability wherein a 35 μm thick film of the thermoplastic composition exhibits a change in ΔE value of the CIE1976 L*, a*, b* color system (as used herein, "ΔE" refers to $ΔE^*_{ab}$ as determined according to ISO 11664-4: 2008(E)/CIE S 014-4/E:2007, with color measurements made according to ASTM D2244-11, more specifically using a MACBETH ColorEye 7000 Spectrophotometer (with illuminant D65, observer angle of 10°, geometry-specular component included, calibration transmission mode), of less than or equal to 1.0 (more specifically ≤0.7, and even more specifically ≤0.7) after 252 $kJ/m^2$ of exposure according to accelerated weathering testing protocol of ASTM G-155-05a, as compared to fresh non-aged sample. Color stability and amelioration of photoyellowing can be especially advantageous for colored thermoplastic compositions, and in some embodiments the thermoplastic composition exhibits CIE1976 L*, a*, b* values determined according to ASTM D2244-11 under the above-described conditions of an L* value of greater than 60 (more specifically greater than 65), an a* value of greater than or equal to −1, and a b* value of less than or equal to 1 (more specifically less than or equal to 0.5). Targeted color specifications are typically achieved by using one or more dyes or pigments, as further exemplified below. In some embodiments, as is known in the coloration art, a blue colorant and optionally a red colorant are used in combination with the phthalone compound to color balance the visible yellow color of the phthalone compound.

In some embodiments, the phthalone compound has a decomposition onset temperature, $T_d$, of at least 250° C., more specifically at least 270° C. as determined according to ASTM E2550-11 using a nitrogen or other inert atmosphere and temperature ramp of 20° C./min ranging from 25° C. to 800° C. Td can be determined using thermogravimetric analysis (also referred to as "TGA") using a TGA 2950 instrument equipped with an auto sampler, and available from TA Instruments. TGA measures the amount of weight change in a material as a function of temperature in a controlled atmosphere. TGA can be carried out either using a programmed temperature setting whereby the sample is heated at a pre-determined rate, or the sample is subjected to a constant temperature (isothermal condition). In the present disclosure the sample was equilibrated to an initial temperature of 40° C. for a period of 2 to 3 minutes and then heated at the rate of 10° C. per minute up to a maximum temperature of 600° C. under air. The weight of the sample was monitored continuously throughout the heating process. Any weight loss is generally indicative of decomposition or degradation of the sample. This technique was used to measure the thermal stability for the anthrapyridone compounds disclosed herein. The thermal stability data in turn was used to identify anthrapyridone compounds that can be benefically used as colorants in colored polymer compositions. In general the higher the decomposition temperature of an anthrapyridone compound, the more suitable it will be as a colorant for high temperature compositions and high temperature end uses. A weight loss temperature curve can be generated from the TGA experiment. The TGA results are expressed in terms of $T_d$ (also referred to as Decomposition Onset Temperature). For the purposes of this disclosure, $T_d$ represents the inflection point on the weight loss temperature curve. In other words, $T_d$ is the temperature corresponding to the point at which the tangent to the curve has the highest slope.

The thermoplastic composition can further include additives such as impact modifier(s). Impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. For use in weatherable applications, it can be beneficial to use impact modifiers that have good UV resistance, such as acrylic and/or siloxane impact modifiers.

In addition to the polyaryl ester polymer or copolymer (and any impact modifier), the thermoplastic composition can include various additives ordinarily incorporated into polymer compositions of this type. Such additives can be mixed at a suitable time during the mixing of the components for forming the composition. Additives include fillers, reinforcing agents, antioxidants, heat stabilizers, light stabilizers (including ultraviolet (UV) light stabilizers), plasticizers, lubricants, mold release agents, antistatic agents, epoxides, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt. %, based on the total weight of the composition.

As mentioned above, other colorants such as pigment and/or dye additives can also be present in addition to the pyrophthalone compound. Exemplary pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.0001 to 1 parts by weight, based on 100 parts by weight of polymer and impact modifier.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinoline-2; 7-dimethylamino-4-methylquinoline-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.001 to 1 parts by weight, based on 100 parts by weight of the polymer and impact modifier.

The thermoplastic compositions can be manufactured by various methods. For example, powdered polymer, the phthalone compound, and/or other optional components are first blended, optionally with fillers in a HENSCHEL-Mixer* high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Yellowness Index (YI) for laboratory scale samples is measured in accordance with ASTM E313-10. Transparency is described by two parameters, percent transmission and percent haze. Percent transmission and percent haze for laboratory scale samples were determined using ASTM D1003-11e1.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like.

Numbered Embodiments

Below are described a series of numbered embodiments in which:

1. A thermoplastic composition comprising a polyaryl ester polymer or copolymer and a phthalone compound according to the formula:

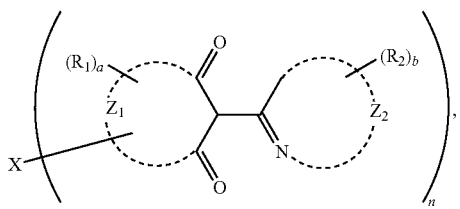

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ can independently be halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2 and is a single bond or a divalent organic radical bonded to the $Z_1$ ring structure through an ether, ketone, or thio linkage.

2. The thermoplastic composition of embodiment 1, wherein a 35 μm thick film of the thermoplastic composition exhibits a change in ΔE value of the CIE1976 L*, a*, b* color measurement system as specified by ISO 11664-4:2008(E)/CIE S 014-4/E:2007, measured according to ASTM D2244-11, of less than or equal to 1.0 after 252 kJ/m² of exposure according to accelerated weathering testing protocol of ASTM G-155-05a.

3. The thermoplastic composition of embodiment 2, wherein the thermoplastic composition exhibits a ΔE color difference value of less than or equal to 0.7 after 252 kJ/m² of exposure.

4. The thermoplastic composition of embodiment 2, wherein the thermoplastic composition exhibits a change in ΔE value of less than or equal to 0.5 after 252 kJ/m² of exposure.

5. The thermoplastic composition of any of embodiments 1-4, wherein the thermoplastic composition exhibits CIE1976 L*, a*, b* values determined according to ASTM D2244-11 of an L* value of greater than 60, an a* value of greater than or equal to −1, and a b* value of less than or equal to 1.

6. The thermoplastic composition of any of embodiments 1-4, wherein the thermoplastic composition exhibits CIE1976 L*, a*, b* values determined according to ASTM D2244-11 of an L* value of greater than 65, an a* value of greater than or equal to −1, and a b* value of less than or equal to 0.5.

7. The thermoplastic composition of any of embodiments 1-6, wherein the phthalone compound has a decomposition onset temperature, $T_d$, of at least 250° C., as determined according to ASTM E2550-11.

8. The thermoplastic composition of any of embodiments 1-6, wherein the phthalone compound has a decomposition onset temperature, $T_d$, of at least 270° C., as determined according to ASTM E2550-11.

9. The thermoplastic composition of any of embodiments 1-8, wherein $Z_2$ represents the atoms necessary to complete a pyridine ring.

10. The thermoplastic composition of embodiment 9, wherein the phthalone compound is according to the formula:

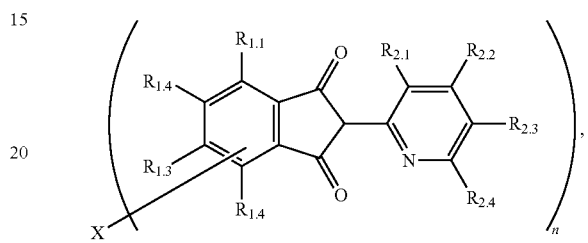

wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined in embodiment 1, and X is present in place of one of $R_{1.1}$, $R_{1.2}$, $R_{1.3}$, or $R_{1.4}$ when n is 2.

11. The thermoplastic composition of embodiment 9, wherein the phthalone compound is according to the formula:

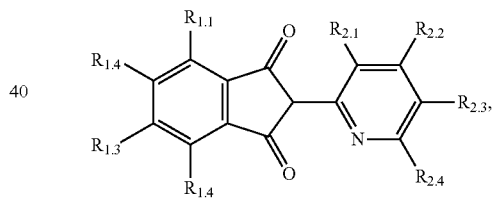

wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

12. The thermoplastic composition of any of embodiments 1-11, wherein the phthalone compound is according to the formula:

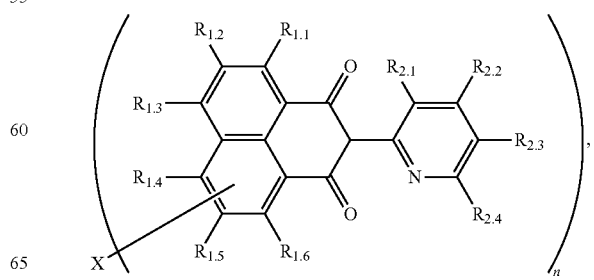

wherein

R$_{1.1}$, R$_{1.2}$, R$_{1.3}$, R$_{1.4}$, R$_{1.5}$, R$_{1.6}$, R$_{2.1}$, R$_{2.2}$, R$_{2.3}$, and R$_{2.4}$ are each independently hydrogen, halogen, a C$_1$-C$_{18}$ alkyl group, a C$_6$-C$_{12}$ aryl group, a C$_1$-C$_{18}$ alkoxy group, or a C$_6$-C$_{12}$ aryloxy group, n and X are as defined in embodiment 1, and X is present in place of one of R$_{1.1}$, R$_{1.2}$, R$_{1.3}$, R$_{1.4}$, R$_{1.5}$, or R$_{1.6}$, when n is 2.

13. The thermoplastic composition of any of embodiments 1-12, wherein Z$_2$ represents the atoms necessary to complete a quinoline ring.

14. The thermoplastic composition of any of embodiments 1-13, wherein the phthalone compound is

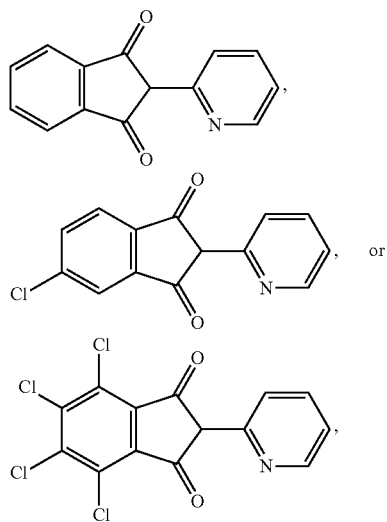

or a combination comprising at least one of the foregoing.

15. The thermoplastic composition of any of embodiments 1-14, comprising from 0.0001 wt. % to 1 wt. % of the phthalone compound, based on the total weight of the polyaryl ester polymer or copolymer.

16. The thermoplastic composition of any of embodiments 1-14, comprising from 0.001 wt. % to 0.01 wt. % of the phthalone compound, based on the total weight of the polyaryl ester polymer or copolymer.

17. The thermoplastic composition of any of embodiments 1-14, comprising from 0.01 wt. % to 0.1 wt. % of the phthalone compound, based on the total weight of the polyaryl ester polymer or copolymer.

18. The thermoplastic composition of any of embodiments 1-14, comprising from 0.02 wt. % to 0.03 wt. % of the phthalone compound, based on the total weight of the polyaryl ester polymer or copolymer.

19. The thermoplastic composition of any of embodiments 1-18, further comprising a blue colorant to balance the color of the phthalone compound.

20. The thermoplastic composition of any of embodiments 1-19, wherein the polyaryl ester polymer copolymer is a polyaryl ester-polycarbonate copolymer.

21. The thermoplastic composition of any of embodiments 1-19, wherein the polyaryl ester polymer or copolymer is a copolymer of a polyaryl ester derived from resorcinol and a mixture of isophthalic acid or anhydride, terephthalic acid or anhydride, and resorcinol, and a polycarbonate derived from bisphenol A and a carbonate source.

22. The thermoplastic composition of any of embodiments 1-19, wherein the polyaryl ester polymer or copolymer comprises at least 5 weight percent, based on the weight of the polyaryl ester polymer or copolymer, of repeating units of the formula:

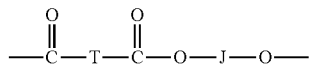

in which at least 80 percent of the total number of T groups, and/or at least 80 percent of the total J groups contain aromatic moieties and the balance thereof are aliphatic, alicyclic, or aromatic.

23. The thermoplastic composition of embodiment 22, wherein the at least 80 percent of the total number of T groups containing aromatic moieties are derived from isophthalic acid and/or terephthalic acid.

24. The thermoplastic composition of embodiment 22, wherein at least 90 percent of the total number of T groups contain aromatic moieties derived from isophthalic acid and/or terephthalic acid.

25. The thermoplastic composition of any of embodiments 22-24, wherein at least 80 percent of the total number of J groups contain aromatic moieties derived from resorcinol and the balance thereof are aliphatic, alicyclic, or aromatic.

26. The thermoplastic composition of any of embodiments 22-25, wherein at least 90 percent of the total J groups contain aromatic moieties and the balance thereof are aliphatic, alicyclic, or aromatic.

27. The thermoplastic composition of any of embodiments 22-26, wherein the polyaryl ester polymer or copolymer comprises:

from 5 wt. % to 30 wt. % of ester repeat units represented by the formula:

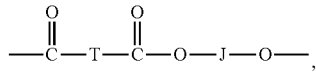

and from 70 wt. % to 95 wt. % of carbonate repeat units represented by the formula:

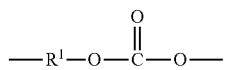

in which at least 60 percent of the total number of R$^1$ groups contain aromatic moieties and the balance thereof are aliphatic, alicyclic, or aromatic;

with the proviso that the sum of wt. % of the ester repeat units and the wt. % of the carbonate repeat units is 100.

28. The thermoplastic composition of embodiment 27, wherein all of the R$^1$ groups contain aromatic moieties.

29. The thermoplastic composition of embodiment 27, wherein all of the R$^1$ groups are derived from bisphenol A and/or resorcinol.

30. The thermoplastic composition of embodiment 27, wherein the T groups are derived from isophthalic acid and/or terephthalic acid, the J groups are derived from resorcinol, and the R$^1$ groups are derived from bisphenol A.

31. The thermoplastic composition of any of embodiments 1-30, that is free of dyes with thermal stability less than 270° C. and/or UV-VIS absorption more than 450 nm that exhibit photobleachable absorbance of light in the 400-450 nm range.

32. The thermoplastic composition of any of embodiments 1-30, wherein the phthalone compound exhibits photobleachable absorbance of light in the 400-450 nm range and the polyaryl ester polymer or copolymer exhibits photoyellowing in the 400-450 nm range.

33. A formed plastic article comprising the thermoplastic composition of any of embodiments 1-32.

34. The plastic article of embodiment 33, wherein the article is an electronic display window, an illuminant lens or cover, or an opaque automotive component.

35. A method of making a plastic article, comprising heating the composition of any of embodiments 1-32 to a melt temperature of at least 250° C., and extruding or molding the plastic article.

36. The method of embodiment 35, wherein the melt temperature is at least 280° C.

37. The method of embodiment 35, wherein the melt temperature is at least 290° C.

38. A plastic article prepared by the method of any of embodiments 35-37.

39. An LED light cover formed from a thermoplastic composition comprising a polyaryl ester polymer or copolymer and a phthalone compound according to the formula:

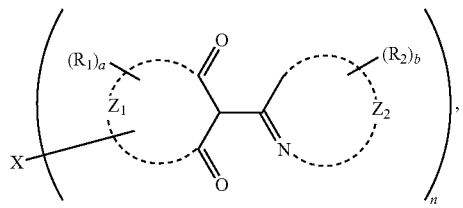

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ can independently be halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2 and is a single bond or a divalent organic radical bonded to the $Z_1$ ring structure through an ether, ketone, or thio linkage.

40. A thermoplastic composition comprising a copolymer of a polyaryl ester derived from resorcinol and a mixture of isophthalic acid or anhydride, terephthalic acid or anhydride, and resorcinol, and a polycarbonate derived from bisphenol A and a carbonate sourcepolyaryl ester, and:

0.0001 wt. % to 1 wt. %, based on the total weight of the copolymer, of a compound according to the formula

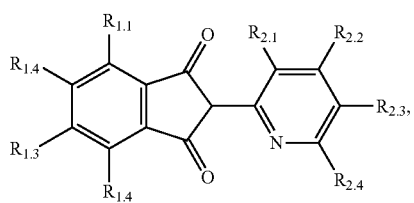

wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen or halogen.

The thermoplastic compositions are further illustrated by the following non-limiting examples.

EXAMPLES

For experimental purposes, film samples having a thickness of 35 μm were prepared in two replicates (Film A and B) from thermoplastic compositions containing 200 ppm (0.02 wt. %) of pyrophthalone, a compound having the structure:

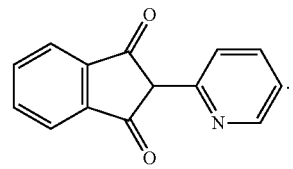

(CAS #641-63-4, with HPLC purity of 99.98%). Film samples were prepared by making a 20% weight/volume (w/v) solution of the above polymer in dichloromethane and dispensing the solution using a doctor blade apparatus. In the control samples designated as P-1, the polymer was a BPA polycarbonate made by interfacial process with an MVR at 300° C./1.2 kg of 5.1-6.9 g/10 min and weight average molecular weight of 41,725 using polystyrene standards (CAS No. 111211-39-3). In the sample designated as P-2, the polymer was a copolymer obtained from SABIC INNOVATIVE PLASTICS of about 20 wt % polyarylate derives from a 50/50 wt. % blend of isophthalate and terephthalate (50/50) diacid residues and resorcinol diol residues, and about 80 wt. % BPA polycarbonate, the P-2 copolymer having a weight average molecular weight of about 30,000 relative to polycarbonate standards. After drying/curing, the samples were subjected to weathering conditions in a weatherometer according to the ASTM G155-05a test protocol set forth in Table 2 below.

TABLE 2

Test Protocol
Test Protocol : ASTM G155-05a

| Light Cycle setting : | |
| --- | --- |
| Segment 1:102 Minutes | |
| Black Panel Temperature | 63° C. |
| Chamber Temperature | 42° C. |
| Relative Humidity | 50% |
| Irradiance at 340 nm | 0.35 W/sq. m |
| Specimen Spray | No |
| Rack Spray | No |
| Segment 2:18 Minutes | |
| Black Panel Temperature | 63° C. |
| Chamber Temperature | 42° C. |
| Relative Humidity | 50% |
| Irradiance at 340 nm | 0.35 W/sq. m |
| Specimen Spray | Yes |
| Rack Spray | No |

TABLE 2-continued

Test Protocol
Test Protocol : ASTM G155-05a

| Xenon Lamp Filters | |
|---|---|
| Inner Filter | S. Boro |
| Outer Filter | S. Boro |

The films were periodically taken out from the weatherometer to measure for ΔE (the color difference between the unexposed sample to the exposed sample, $\Delta E^*_{ab}$ as determined according to ISO 11664-4:2008(E)/CIE S 014-4/E: 2007) and yellowness index (YI as specified in ASTM E313-10) (to assess changes in yellowness index of the sample compared to the unexposed sample). The results are set forth in Tables 3 through 6.

TABLE 3

ΔE values for P-2 films without pyrophthalone dye

| ASTM G-155 EXPOSURE (Hours) | ASTM G-155 EXPOSURE (KJ/m2) | ΔE VALUES WITHOUT DYE for P-2 | |
|---|---|---|---|
| | | Replicate-A | Replicate-B |
| 0 | 0.0 | 0.0 | 0.0 |
| 1 | 1.26 | 0.2 | 0.2 |
| 2 | 2.52 | 0.4 | 0.4 |
| 3 | 3.78 | 0.5 | 0.5 |
| 4 | 5.04 | 0.6 | 0.6 |
| 8 | 10.08 | 0.9 | 0.9 |
| 12 | 15.12 | 1.0 | 1.0 |
| 16 | 20.16 | 1.0 | 1.0 |
| 24 | 30.24 | 1.1 | 1.1 |
| 32 | 40.32 | 1.1 | 1.2 |
| 200 | 252.00 | 1.6 | 1.6 |

TABLE 4

ΔE values for P-2 films with 200 ppm pyrophthalone dye

| ASTM G-155 EXPOSURE (Hours) | ASTM G-155 EXPOSURE (KJ/m²) | ΔE VALUES WITH 200 PPM PYROPHTHALONE DYE | |
|---|---|---|---|
| | | Replicate-A | Replicate-B |
| 0 | 0.0 | 0.0 | 0.0 |
| 1 | 1.26 | 0.1 | 0.1 |
| 2 | 2.52 | 0.1 | 0.2 |
| 3 | 3.78 | 0.1 | 0.2 |
| 4 | 5.04 | 0.1 | 0.2 |
| 8 | 10.08 | 0.1 | 0.2 |
| 12 | 15.12 | 0.2 | 0.2 |
| 16 | 20.16 | 0.1 | 0.2 |
| 24 | 30.24 | 0.2 | 0.2 |
| 32 | 40.32 | 0.1 | 0.2 |
| 200 | 252.00 | 0.3 | 0.3 |

TABLE 5

YI values for P-2 films with 200 ppm pyrophthalone dye in Replicate-A

| ASTM G-155 EXPOSURE (KJ/m2) | L* | a* | b* | YID |
|---|---|---|---|---|
| 0.0 | 95.83 | −0.58 | 1.44 | 1.94 |
| 1.26 | 95.91 | −0.58 | 1.48 | 2.01 |
| 2.52 | 95.92 | −0.58 | 1.47 | 2.00 |
| 3.78 | 95.91 | −0.56 | 1.44 | 1.97 |
| 5.04 | 95.89 | −0.53 | 1.42 | 1.96 |
| 10.08 | 95.90 | −0.50 | 1.42 | 2.01 |
| 15.12 | 95.94 | −0.48 | 1.37 | 1.92 |
| 20.16 | 95.90 | −0.48 | 1.36 | 1.91 |
| 30.24 | 95.90 | −0.46 | 1.35 | 1.89 |
| 40.32 | 95.89 | −0.48 | 1.36 | 1.89 |
| 252.00 | 95.88 | −0.65 | 1.72 | 2.31 |

TABLE 6

YI values for P-2 films replicate-A without pyrophthalone dye

| ASTM G-155 EXPOSURE (KJ/m2) | L* | a* | b* | YID |
|---|---|---|---|---|
| 0.0 | 95.96 | 0.03 | 0.25 | 0.40 |
| 1.26 | 95.97 | −0.05 | 0.41 | 0.62 |
| 2.52 | 95.94 | −0.13 | 0.61 | 0.9 |
| 3.78 | 95.92 | −0.20 | 0.72 | 1.05 |
| 5.04 | 95.91 | −0.23 | 0.82 | 1.19 |
| 10.08 | 95.90 | −0.33 | 1.06 | 1.53 |
| 15.12 | 95.91 | −0.38 | 1.16 | 1.65 |
| 20.16 | 95.90 | −0.41 | 1.19 | 1.68 |
| 30.24 | 95.9 | −0.43 | 1.25 | 1.75 |
| 40.32 | 95.90 | −0.45 | 1.30 | 1.81 |
| 252.00 | 95.91 | −0.65 | 1.69 | 2.27 |

As clearly demonstrated by comparing the data in Tables 3 and 4, the film samples of the polyarylate P-2 containing the pyrophthalone dye exhibited significantly less change in ΔE compared to the samples without the dye, indicating superior color stability. Tables 5 and 6 show that the yellowness (as measured by b*) of the samples containing the pyrophthalone dye stayed within a few percent of its initial value through the first 40 kJ/m² of exposure, and ended the test with a b* value and YI values less than 20% higher than its starting value. The comparison material without the dye, on the other hand, experienced an increase in YI value of over 460% and an over 570% increase in b* value.

Control samples of P-1 films contained only bisphenol-A polycarbonate, which does not exhibit the same type of photoyellowing as polyarylate polymers. When a film containing P-1 with 0.02 wt % pyrophthalone dye was exposed to similar weathering as the P-2 films, the dye shows fading behavior, but without the concomitant yellowing of the polymer so that the yellowness index decreased with increasing exposure as shown in Table 7. Stable color was produced by the combination of the polyarylate polymer and the pyrophthalone dye; color was not stable when only one of those two components was present.

TABLE 7

P1 films showing continuous reduction in
YI due to fading of Pyrophthalone Dye

| ASTM G-155 EXPOSURE (KJ/m2) | L* | a* | b* | YID |
|---|---|---|---|---|
| 0.0 | 94.56 | −0.73 | 1.81 | 2.46 |
| 1.26 | 96.00 | −0.71 | 1.70 | 2.25 |
| 2.52 | 95.96 | −0.70 | 1.68 | 2.24 |
| 3.78 | 95.96 | −0.68 | 1.63 | 2.17 |
| 5.04 | 95.97 | −0.64 | 1.57 | 2.09 |
| 10.08 | 95.99 | −0.57 | 1.41 | 1.88 |
| 15.12 | 96.01 | −0.52 | 1.33 | 1.79 |
| 20.16 | 96.00 | −0.47 | 1.19 | 1.59 |
| 30.24 | 96.01 | −0.37 | 1.02 | 1.39 |
| 40.32 | 96.01 | −0.32 | 0.90 | 1.23 |
| 252.00 | 96.03 | −0.09 | 0.47 | 0.69 |

In addition, exemplary pyrophthalone compounds were evaluated for thermal stability and chromatic characteristics compared to state of the art dyes that have been used or suggested for use against polyaryl ester photoyellowing. The dyes were tested for thermal stability using thermogravimetric analysis (TGA). TGA was performed using a TGA 2950 available from TA Instruments, under nitrogen gas with start temperature of 40° C. and end temperature of 800° C. The ramp used for the TGA was 20° C. per minute. The comparison was made for each dye by noting the temperature at 10 & 20% weight loss by TGA. The dyes were subjected to UV/VIS studies carried out by dissolving 20 mg of dye in 100 ml of dichloromethane solvent. The absorption was measured for path length of 1 cm in cuvette. The results are shown in Table 8 and the FIGURE.

TABLE 8

Thermal Stability & UV/VIS Performance of different photo-fading dyes

| PHOTO-BLEACHABLE DYE | Temp (° C.) at % wt Remaining based on TGA | | COMMENT |
|---|---|---|---|
| | 90 | 80 | |
| DIMETHYL AMINO CINNAMALDEHYDE | 182 | 192 | POOR THERMAL STABILITY |
| QUINOLINE YELLOW | 278 | 291 | POOR UV-VIS ABSORPTION PATTERN |
| SOLVENT YELLOW 72 | 247 | 257 | POOR THERMAL STABILITY |
| PYROPHTHALONE | 270 | 283 | BETTER THERMAL STABILITY & ABSORPTION |
| 4-CHLORO-PYROPHTHALONE | 285 | 296 | BETTER THERMAL STABILITY & ABSORPTION |
| TETRACHLORO-PYROPHTHALONE | 362 | 375 | BETTER THERMAL STABILITY & ABSORPTION |

As shown in the FIGURE, the quinoline yellow and Solvent Yellow 72 (designated in the FIGURE as R872) dyes had absorbance that varied from 400 nm to 510 nm, which was undesirable for use as a color compensator for polyarylates because it does not match with the spectral characteristics of the photoyellowing experienced by the polyarylates. The pyrophthalone compounds on the other hand (pyrophthalone, 4-chloro-pyrophthalone, and tetrachloro-pyrophthalone) absorbed precisely in the 400 nm to 450 nm range where polyaryl esters exhibit photoyellowing, and thus exhibited better absorption characteristics. The comparison dye dimethyl amino cinnamaldehyde had the desired spectral absorbance, but as shown in Table 8, did not provide sufficient thermal stability to avoid degradation at polyaryl ester thermoplastics processing temperatures compared to the pyrophtalones, which provided significantly higher TGA temperatures than the dimethyl amino cinnamaldehyde. Also as shown in Table 8, the pyrophthalones provided better thermal stability than solvent yellow 72, as indicated by the higher TGA temperatures compared to solvent yellow 72. Only the pyrophthalone dyes provided both the desired spectral absorption and thermal stability for use with polyarylates.

As used herein, the singular forms "a," "an," and "the" include plural referents unless the context clearly dictates otherwise. The term "and/or" means the items connected by the term can be together in combination or as separate alternatives. For example, if a bucket is described as being filled with sticks and/or stones, the description includes a bucket filled with sticks, a bucket filled with stones, and a bucket filed with both sticks and stones. The modifier "about" used in connection with a quantity is inclusive of the stated value and has the meaning dictated by the context (e.g., includes the degree of error associated with measurement of the particular quantity. The terms "front", "back", "bottom", and/or "top" are used herein, unless otherwise noted, merely for convenience of description, and are not limited to any one position or spatial orientation. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). The suffix "(s)" is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a C2-6 alkanoyl group such as acyl); carboxamido; C1-6 or C1-3 alkyl, cycloalkyl, alkenyl, and alkynyl (including groups having at least one unsaturated linkages and from 2 to 8, or 2 to 6 carbon atoms); C1-6 or C1-3 alkoxy groups; C6-10 aryloxy such as phenoxy; C1-6 alkylthio; C1-6 or C1-3 alkylsulfinyl; C1-6 or C1-3 alkylsulfonyl; aminodi(C1-6 or C1-3)alkyl; C6-12 aryl having at least one aromatic rings (e.g., phenyl, biphenyl, naphthyl, or the like, each ring either substituted or unsubstituted aromatic); C7-19 alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising a polyaryl ester polymer or copolymer and
    a compound comprising a phthalone ring structure selected from:
    a compound according to the formula:

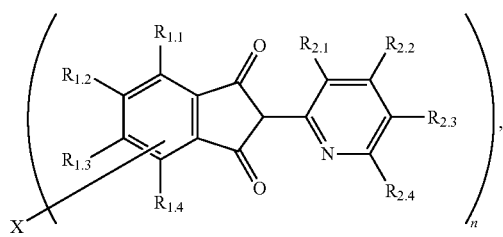

wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n is 2, and X is a single bond or a divalent organic radical bonded to the phthalone ring structure through an ether, ketone, or thio linkage and is present in place of one of $R_{1.1}$, $R_{1.2}$, $R_{1.3}$, or $R_{1.4}$, or a compound according to the formula

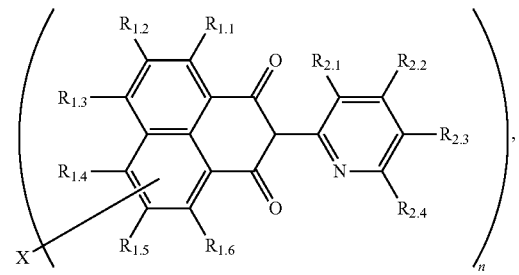

wherein $R_{1.1}$, $R_{1.2}$, $R_{1.3}$, $R_{1.4}$, $R_{1.5}$, $R_{1.6}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n is 2, and X is a single bond or a divalent organic radical bonded to the phthalone ring structure through an ether, ketone, or thio linkage and is present in place of one of $R_{1.1}$, $R_{1.2}$, $R_{1.3}$, $R_{1.4}$, $R_{1.5}$, or $R_{1.6}$.

2. The thermoplastic composition of claim 1, wherein a 35 μm thick film of the thermoplastic composition exhibits a change in ΔE value of the CIE1976 L*, a*, b* color measurement system as specified by ISO 11664-4:2008(E)/CIE S 014-4/ E:2007, measured according to ASTM D2244-11, of less than or equal to 1.0 after 252 kJ/m² of exposure according to accelerated weathering testing protocol of ASTM G-155-05a.

3. The thermoplastic composition of claim 2, wherein the thermoplastic composition exhibits a ΔE color difference value of less than or equal to 0.7 after 252 kJ/m² of exposure.

4. The thermoplastic composition of claim 2, wherein the thermoplastic composition exhibits a change in ΔE value of less than or equal to 0.5 after 252 kJ/m² of exposure.

5. The thermoplastic composition of claim 1, wherein the thermoplastic composition exhibits CIE1976 L*, a*, b* values determined according to ASTM D2244-11 of an L* value of greater than 60, an a* value of greater than or equal to −1, and a b* value of less than or equal to 1.

6. The thermoplastic composition of claim 1, wherein the thermoplastic composition exhibits CIE1976 L*, a*, b* values determined according to ASTM D2244-11 of an L* value of greater than 65, an a* value of greater than or equal to −1, and a b* value of less than or equal to 0.5.

7. The thermoplastic composition of claim 1, wherein the compound has a decomposition onset temperature, $T_d$, of at least 250° C., as determined according to ASTM E2550-11.

8. The thermoplastic composition of claim 2, wherein the compound has a decomposition onset temperature, $T_d$, of at least 250° C., as determined according to ASTM E2550-11.

9. The thermoplastic composition of claim 1, wherein the compound has a decomposition onset temperature, $T_d$, of at least 270° C., as determined according to ASTM E2550-11.

10. The thermoplastic composition of claim 1, comprising the compound according to the formula:

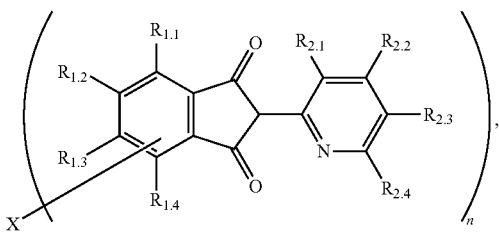

wherein
$R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n is 2, and X is a single bond or a divalent organic radical bonded to the phthalone ring structure through an ether, ketone, or thio linkage and is present in place of one of $R_{1.1}$, $R_{1.2}$, $R_{1.3}$ or $R_{1.4}$.

11. The thermoplastic composition of claim 1, comprising the compound according to the formula:

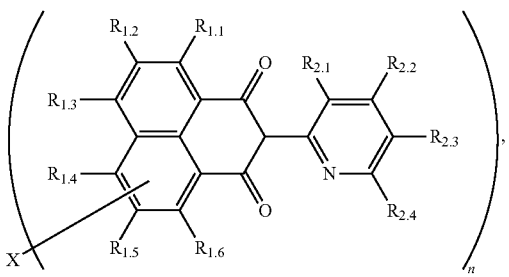

wherein
$R_{1.1}$, $R_{1.2}$, $R_{1.3}$, $R_{1.4}$, $R_{1.5}$, $R_{1.6}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n is 2, and X is a single bond or a divalent organic radical bonded to the phthalone ring structure through an ether, ketone, or thio linkage and is present in place of one of $R_{1.1}$, $R_{1.2}$, $R_{1.3}$, $R_{1.4}$, $R_{1.5}$, or $R_{1.6}$.

12. The thermoplastic composition of claim 1, wherein $Z_2$ represents the atoms necessary to complete a quinoline ring.

13. The thermoplastic composition of claim 1, comprising at least 0.0001 wt. % and less than 0.1 wt. % of the compound, based on the total weight of the polyaryl ester polymer or copolymer.

14. The thermoplastic composition of claim 1, comprising at least 0.01 wt. % of the compound, based on the total weight of the polyaryl ester polymer or copolymer.

15. The thermoplastic composition of claim 1, comprising from 0.02 wt. % to 0.03 wt. % of the compound, based on the total weight of the polyaryl ester polymer or copolymer.

16. The thermoplastic composition of claim 1, further comprising a blue colorant to balance the color of the compound.

17. The thermoplastic composition of claim 1, wherein the polyaryl ester polymer or copolymer is a polyaryl ester-polycarbonate copolymer.

18. The thermoplastic composition of claim 1, wherein the polyaryl ester polymer or copolymer is a copolymer of a polyaryl ester derived from resorcinol and a mixture of isophthalic acid or anhydride, terephthalic acid or anhydride, and resorcinol, and a polycarbonate derived from bisphenol A and a carbonate source.

19. The thermoplastic composition of claim 1, wherein the polyaryl ester polymer or copolymer comprises at least 5 weight percent, based on the weight of the polyaryl ester polymer or copolymer, of repeating units of the formula:

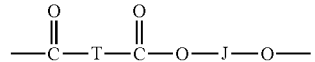

in which at least 80 percent of the total number of T groups, and/or at least 80 percent of the total J groups contain aromatic moieties and the balance thereof are aliphatic, alicyclic, or aromatic.

20. The thermoplastic composition of claim 19, wherein the at least 80 percent of the total number of T groups containing aromatic moieties are derived from isophthalic acid and/or terephthalic acid.

21. The thermoplastic composition of claim 19, wherein at least 90 percent of the total number of T groups contain aromatic moieties derived from isophthalic acid and/or terephthalic acid.

22. The thermoplastic composition of claim 19, wherein at least 80 percent of the total number of J groups contain aromatic moieties derived from resorcinol and the balance thereof are aliphatic, alicyclic, or aromatic.

23. The thermoplastic composition of claim 1, wherein all of the repeat units of the polyaryl ester polymer or copolymer are represented by the formula:

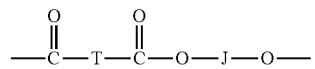

in which at least 90 percent of the total number of T groups, and/or at least 90 percent of the total J groups contain aromatic moieties and the balance thereof are aliphatic, alicyclic, or aromatic.

24. The thermoplastic composition of claim 23, wherein at least 90 percent of the total number of T groups contain aromatic moieties derived from isophthalic acid and/or terephthalic acid.

25. The thermoplastic composition of claim 1, wherein the polyaryl ester polymer or copolymer comprises:
from 5 wt. % to 30 wt. % of ester repeat units represented by the formula:

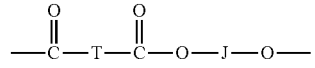

in which at least 90 percent of the total number of T groups, and/or at least 90 percent of the total J groups contain aromatic moieties and the balance thereof are aliphatic, alicyclic, or aromatic; and
from 70 wt.% to 95 wt.% of carbonate repeat units represented by the formula:

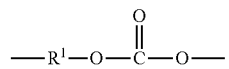

in which at least 60 percent of the total number of $R_1$ groups contain aromatic moieties and the balance thereof are aliphatic, alicyclic, or aromatic;

wherein the weight percentages are based on the weight of the thermoplastic composition and with the proviso that the sum of wt. % of the ester repeat units and the wt. % of the carbonate repeat units is 100.

26. The thermoplastic composition of claim 25, wherein least 90 percent of the total number of T groups contain aromatic moieties derived from isophthalic acid and/or terephthalic acid.

27. The thermoplastic composition of claim 25, wherein all of the $R^1$ groups contain aromatic moieties.

28. The thermoplastic composition of claim 25, wherein all of the $R^1$ groups are derived from bisphenol A and/or resorcinol.

29. The thermoplastic composition of claim 25, wherein the T groups are derived from isophthalic acid and/or terephthalic acid, the J groups are derived from resorcinol, and the $R_1$ groups are derived from bisphenol A.

30. The thermoplastic composition of claim 1, that is free of dyes with thermal stability less than 270° C. and/or UV-VIS absorption more than 450 nm that exhibit photobleachable absorbance of light in the 400-450 nm range.

31. The thermoplastic composition of claim 1, wherein the compound exhibits photobleachable absorbance of light in the 400-450 nm range and the polyaryl ester polymer or copolymer exhibits photoyellowing in the 400-450 nm range.

32. A formed plastic article comprising the thermoplastic composition of claim 1.

33. The plastic article of claim 32, wherein the article is an electronic display window, an illuminant lens or cover, or an opaque automotive component.

34. A method of making a plastic article, comprising heating the composition of claim 1 to a melt temperature of at least 250° C., and extruding or molding the plastic article.

35. The method of claim 34, wherein the melt temperature is at least 280° C.

36. The method of claim 34, wherein the melt temperature is at least 290° C.

37. A plastic article prepared by the method of claim 34.

38. The plastic article of claim 32, wherein the plastic article is an LED light cover.

39. The thermoplastic composition of claim 1, wherein the polyaryl ester copolymer is derived from resorcinol and a mixture of isophthalic acid or anhydride, terephthalic acid or anhydride, and resorcinol, and a polycarbonate derived from bisphenol A and a carbonate source polyaryl ester.

40. The plastic article of claim 32, wherein:
the article has a thickness of 0.035-0.49 mm and thermoplastic composition comprises at least 0.001 wt. % and less than 0.1 wt. % of the compound;
the article has a thickness of 0.5-1.49 mm and thermoplastic composition comprises at least 0.0001 wt. % and less than 0.1 wt. % of the compound;
the article has a thickness of 1.5-2.49 mm and thermoplastic composition comprises at least 0.0001 wt. % and less than 0.1 wt. % of the compound; or
the article has a thickness of 2.5-3 mm and thermoplastic composition comprises at least 0.0001 wt. % and less than 0.1 wt. % of the compound.

* * * * *